P. R. SIMMONS.
MILK BOTTLE CAP MAKING MACHINE.
APPLICATION FILED MAR. 14, 1918.

1,297,023.

Patented Mar. 11, 1919.
6 SHEETS—SHEET 2.

WITNESSES
Frederick Diehl.
C. Bradway

INVENTOR
P. R. Simmons.
BY
ATTORNEYS

P. R. SIMMONS.
MILK BOTTLE CAP MAKING MACHINE.
APPLICATION FILED MAR. 14, 1918.

1,297,023.

Patented Mar. 11, 1919.

WITNESSES
Fred Diehl.
C. Bradway.

INVENTOR
P. R. Simmons.
BY
ATTORNEYS

UNITED STATES PATENT OFFICE.

PAUL RAYMOND SIMMONS, OF HUNTINGTON, INDIANA, ASSIGNOR TO THE SIMMONS MANUFACTURING COMPANY, OF HUNTINGTON, INDIANA.

MILK-BOTTLE-CAP-MAKING MACHINES.

1,297,023.    Specification of Letters Patent.    Patented Mar. 11, 1919.

Application filed March 14, 1918. Serial No. 222,322.

*To all whom it may concern:*

Be it known that I, PAUL R. SIMMONS, a citizen of the United States, and a resident of Huntington, in the county of Huntington and State of Indiana, have invented a new and Improved Milk-Bottle-Cap-Making Machine, of which the following is a full, clear, and exact description.

This invention relates to a machine for automatically cutting out or printing and cutting out disks or other cut-outs from a continuous strip of stock, and for automatically separating the cut-outs whenever separation in an orderly manner is desirable.

The invention has for its general objects to improve and simplify the construction and operation of machines for printing and cutting out milk bottle caps or equivalent articles so as to be reliable and efficient in use, require a minimum of attention after being once started, and to have a high output capacity of from 1,000,000 to 2,000,000 caps per day, or more, according to the speed at which the machine is operated, the cutting of the disks being effected through the employment of rotary cutting cylinders which may revolve at high or low speed.

A more specific object of the invention is the provision of a novel means for cutting out disks or other objects from a continuously fed strip of paper by the rotary cutting elements and automatically separating the disks into sets and uniformly delivering the disks of each set so that their printed sides will all face the same way for facilitating the packing of the disks in tubes or other carriers.

Another object of the invention is to provide a simple, novel and effective mechanism for separating the disks from the web or scrap by means of two sets of separating rolls and chutes, this number of separating rolls and chutes being necessitated by the fact that the disks are cut out in lines as close as possible to each other for minimizing waste, the disks of adjacent lines being staggered.

An additional object is the provision of a machine having simple, novel and effective means for automatically stretching the strip of stock and removing all wrinkles and buckles therefrom preparatory to and while being passed through the printing mechanism.

The invention has as another object the provision of means associated with each cutter to coöperate with the cutter pressure roll for tightly gripping the strip of paper to produce the necessary draft thereon at that time when the portions of the cutting edges of the cutter are tangential to the line of travel of the strip, whereby lost motion between the strip and the cutting cylinders is prevented.

A further detailed object is to improve the printing mechanism as regards the reciprocatory distributing rolls.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views.

The machine comprises in general terms a strip-feeding or guiding means A, printing mechanisms B and B', a cutting mechanism C, a separating mechanism D, and delivery chutes E, all of which are mounted on a suitable frame or stand F.

Figures 1, 12:
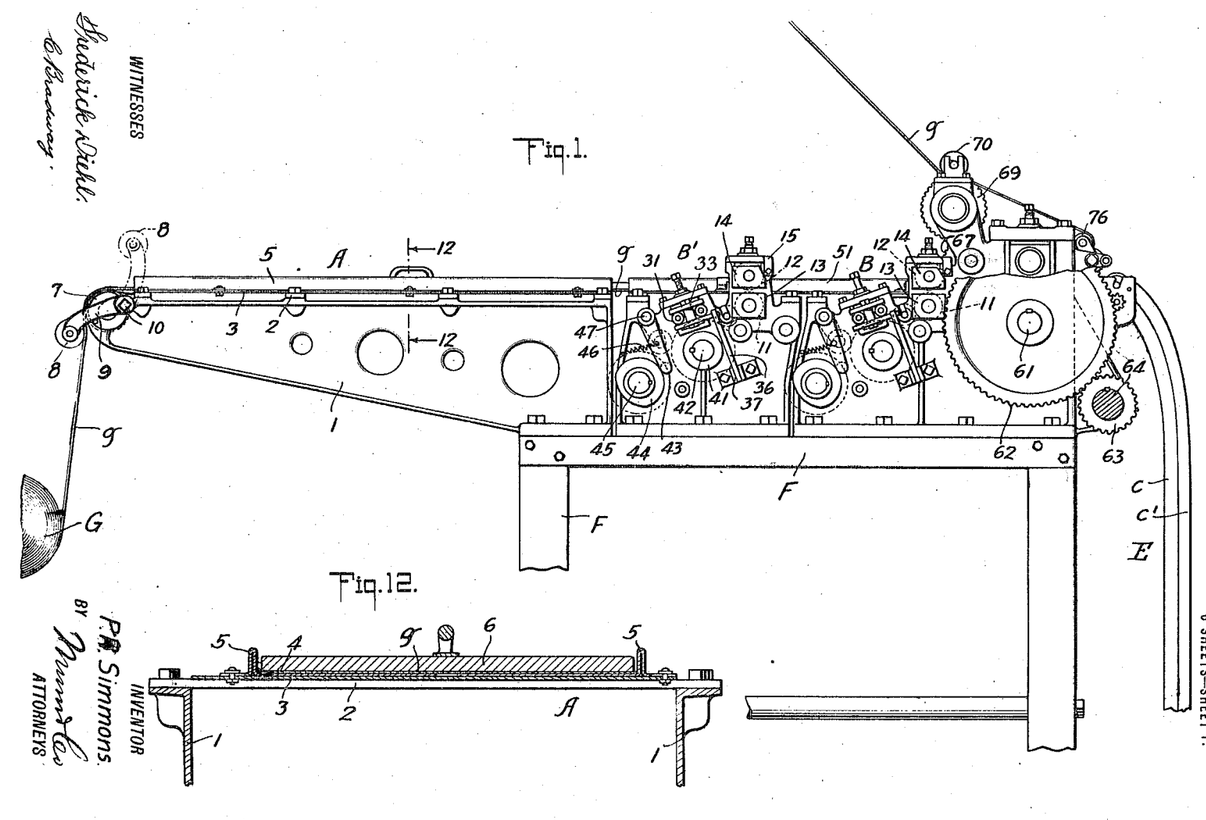
Figure 1 is a side view of the machine.
Fig. 12 is a transverse section on the line 12—12 Fig. 1, drawn on an enlarged scale.

The strip stock from which the milk bottle caps are cut comes in the form of a roll G, Fig. 1, and not only is the strip curled but is more or less buckled or uneven, so that before the strip can be effectively operated on by the machine the curl and the buckles must be removed. The feeding or guiding means A is designed especially to overcome these difficulties. The strip-feeding or guiding means A comprises a pair of spaced frame members 1 bolted to the frame F and projecting from one side thereof. These frame members are connected by cross-bars 2 which support a plate or table 3 on which are adjustably mounted plates 4 that have vertical guide flanges 5 with which the edges of the strips $g$ of stock engage, as clearly shown in Fig. 12. Disposed between the guides 5 is a heavy weight in the form of a flat plate 6 which lies on top of the strip of paper or cardboard $g$ so as to even out the bulges and buckles, and also so as to produce a drag whereby the strip will be maintained taut while passing through the printing mechanisms. At the receiving end of the guide table A is a horizontal roll 7 over which the strip $g$ passes so as to produce a bending action on the strip to counteract the curvature produced by the winding of the roll G, and to increase this bending action a parallel roll 8 engages the strip $g$ below and on the opposite face from the roll 7, said roll 8 being carried by arms 9 hinged at 10 on the table so that the roll 8 can be thrown upwardly to the dotted-line position, Fig. 1, for facilitating the initial running of the strip into the machine.

The printing mechanisms B and B' are substantially the same, so that the description of one will suffice for both. The front printing mechanism B has its rotatable parts driven by the cutting mechanism, and the rear printing mechanism B' is geared to the front printing mechanism to receive power therefrom. The two printing mechanisms are used for different color printing, but if the bottle caps are to be printed in only one color either one of the printing mechanisms may be uncoupled, as desired.

Figures 3, 13:
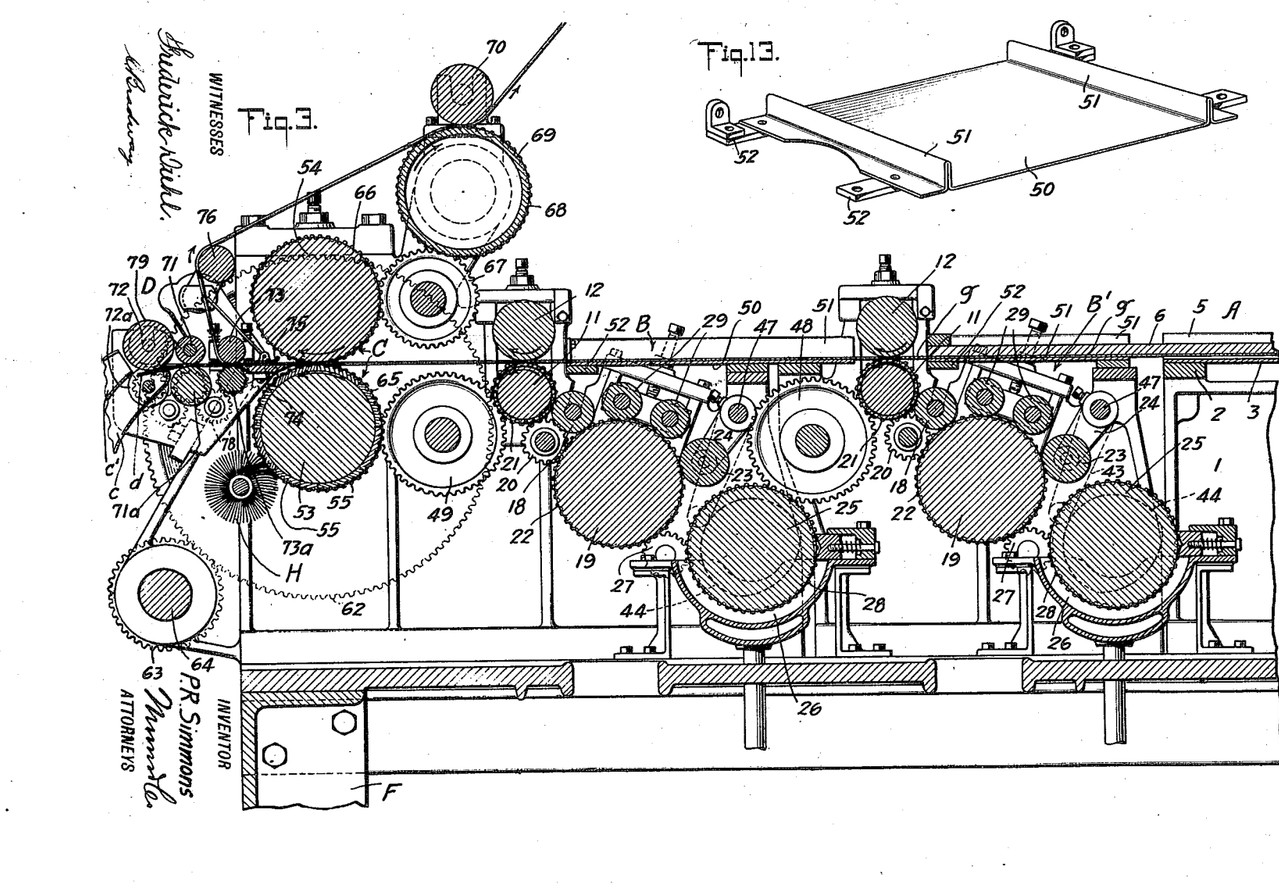
Fig. 3 is a longitudinal vertical section of the printing, cutting and separating mechanisms drawn on an enlarged scale.
Fig. 13 is a perspective view of the cover for one inking mechanism.
Figure 4:
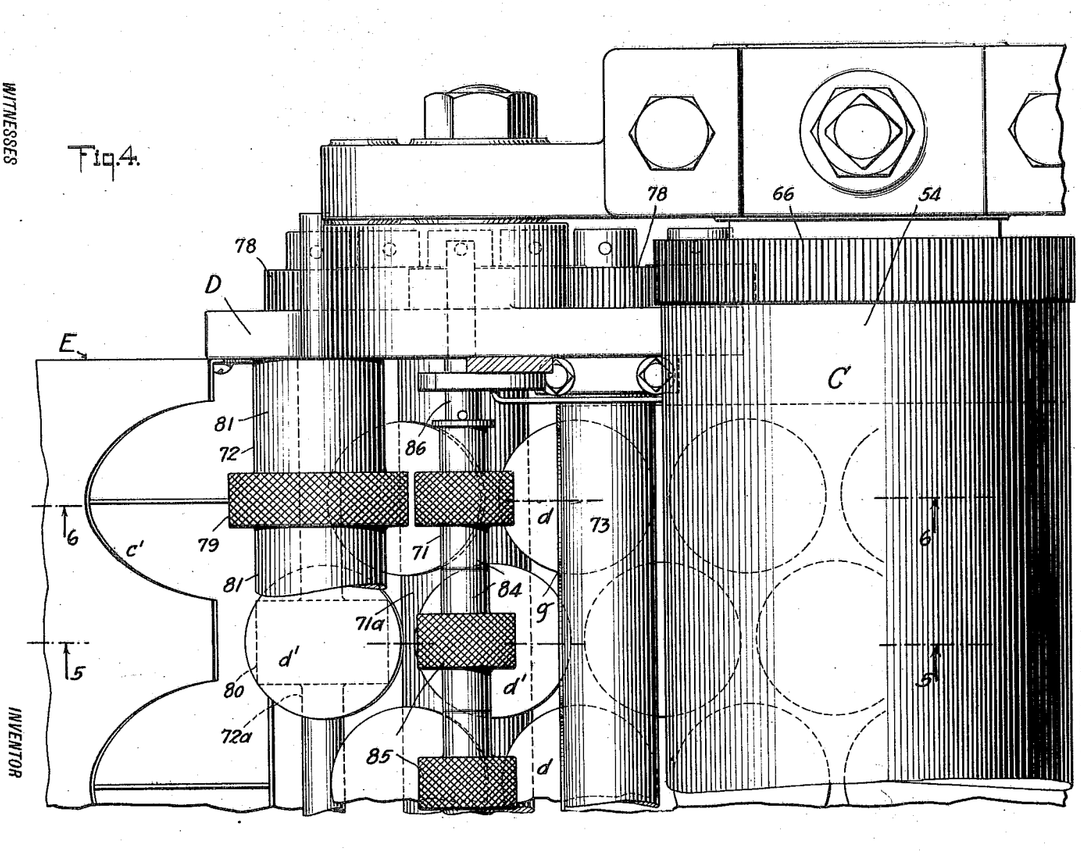
Fig. 4 is a fragmentary plan view of the cutting and separating mechanisms.
Figure 7:
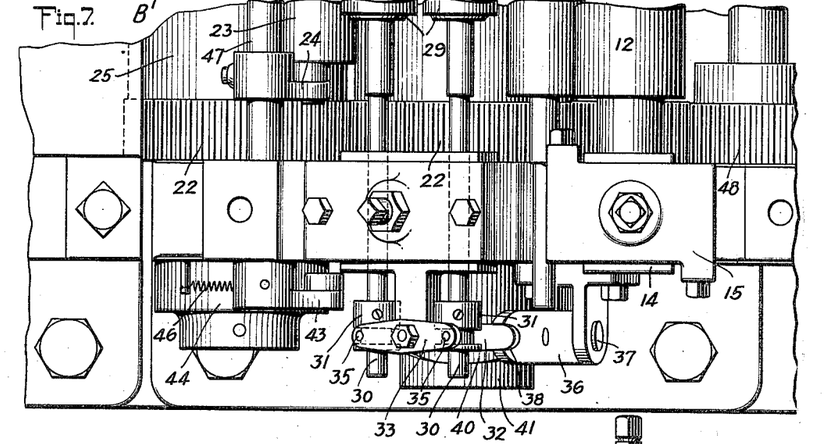
Fig. 7 is a plan view of a portion of the printing mechanism, showing the novel means for reciprocating the distributing rolls.
Figure 8:
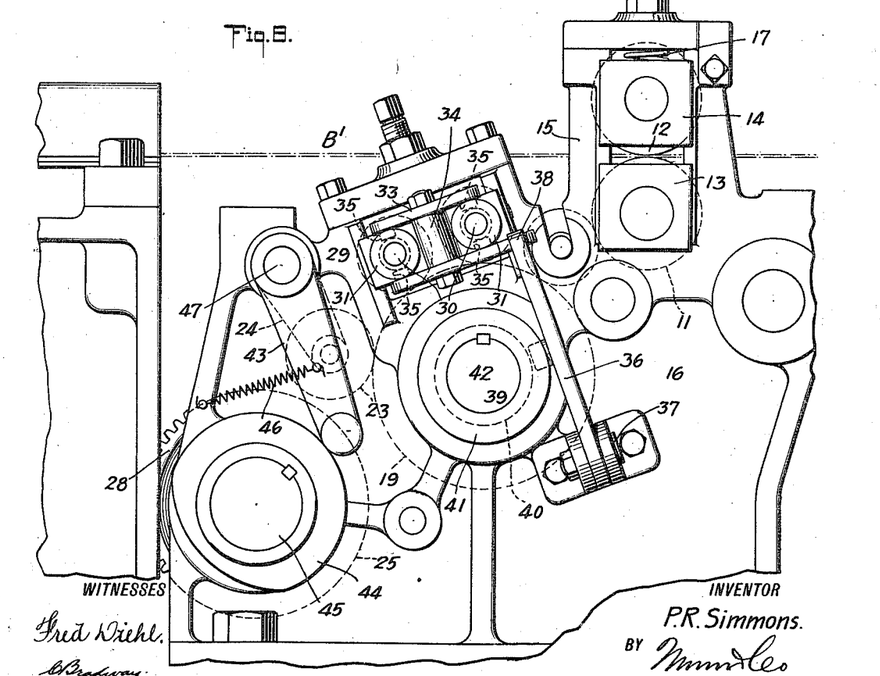
Fig. 8 is a side view of Fig. 7.

The printing mechanism will be described in connection with Figs. 3, 7 and 8. It comprises an electro or type roll 11 over which the strip $g$ passes so as to receive a printing impression on the under side, the strip being pressed against the electroroll by a pressure printing roll 12 under which the strip $g$ travels, the rolls 11 and 12 being mounted in journal boxes 13 and 14, Fig. 8, disposed in bearings 15 in the side frame members 16, and an adjustable spring 17 acts on each of the upper journal boxes 14 to press the roll 12 downwardly toward the electroroll. The electroroll receives ink from a transfer roll 18 which bears on an inking roll 19 which is rotated by an idler 20 meshing with gears 21 and 22 on the electro and inking rolls respectively. The ink is supplied to the inking roll 9 by a dab roll 23 carried by swinging arms 24, and it receives ink from the fountain roll 25 that runs in the ink fountain 26, the fountain roll being rotated by an idler gear 27 which meshes with the gear 22 and with a gear 28 on the fountain roll. The ink on the inking roll 19 is distributed by a pair of reciprocatory distributing rolls 29, which, as shown in Figs. 7 and 8, have journals 30 which extend outside of the machine frame and each is equipped with a collar 31 provided with a groove 32. A rocker 33 fulcrumed on a fixed bearing 34 has a pair of pins 35 engaging in the groove 32 of each collar 31 so that the distributing rolls can rotate, while at the same time they receive longitudinal motion from the rocker, the latter being oscillated by an arm 36 which is fulcrumed at 37 and has a notched upper end 38 to engage the rocker 33, the arm 36 having a pin 39 which engages in a circumferential cam groove 40 of a collar 41 keyed to the journal 42 on the inking roll 19. By this simple arrangement the inking roll imparts reciprocatory motion to the distributing rolls. The dab roll is oscillated by a crank arm 43, Figs. 7 and 8, which bears on a cam wheel 44 keyed to the journal 45 of the fountain roll 25, the arm being held against the cam wheel by a spring 46. This arm 43 is fastened to a shaft 47 which extends across the machine and carries the arms 24 on which the dab roll 23 is mounted. As shown in Fig. 3, an idler gear 48 connects the printing mechanism B and B' together, said idler meshing with the gear 28 on the printing mechanism B' and with the gear 21 on the electroroll 11 of the printing mechanism B. A corresponding idler 49 imparts power to the printing mechanism B, said idler meshing with the gear 21 of the electroroll 11. Over each printing mechanism is a cover plate 50 constructed as shown in Fig. 13, the plate having upstanding flanges 51 to assist in guiding the strip through the printing mechanism, the said plate 50 having members 52 for receiving bolts to secure the cover plate to the machine frame.

Figures 5, 6:
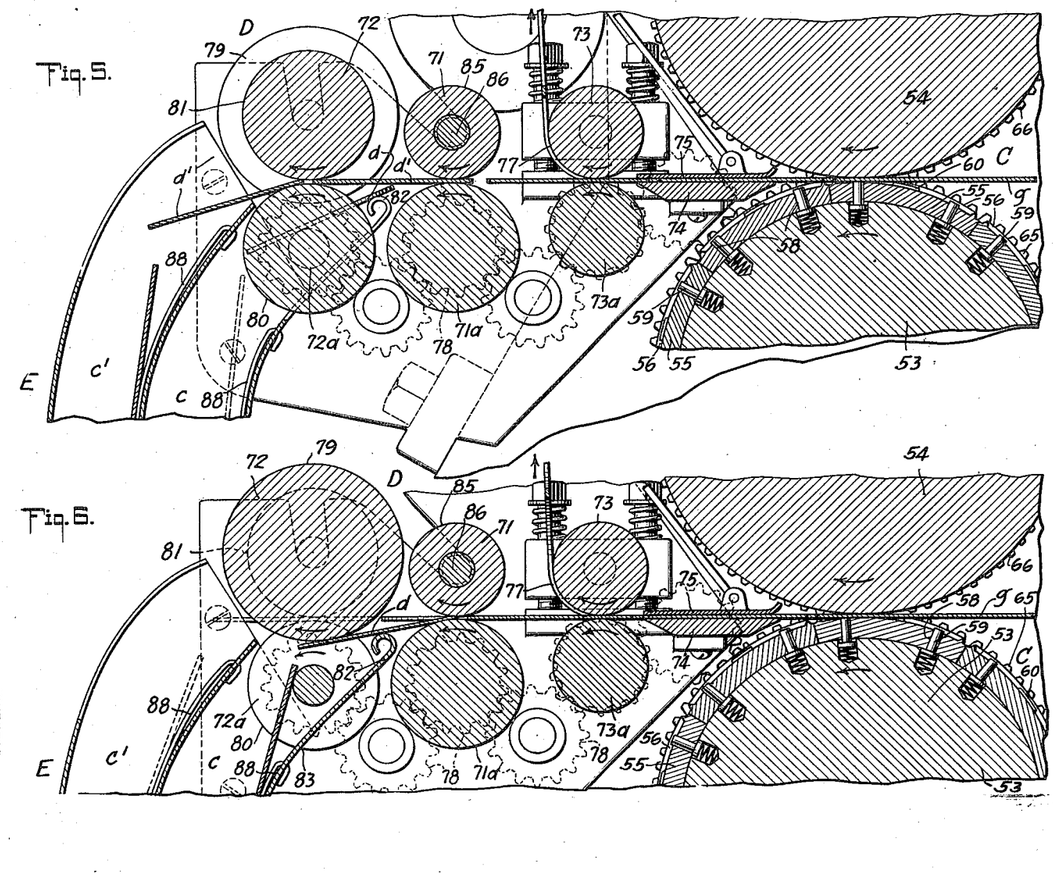
Figs. 5 and 6 are vertical sections taken on the lines 5—5 and 6—6, respectively, Fig. 4.
Figure 9:
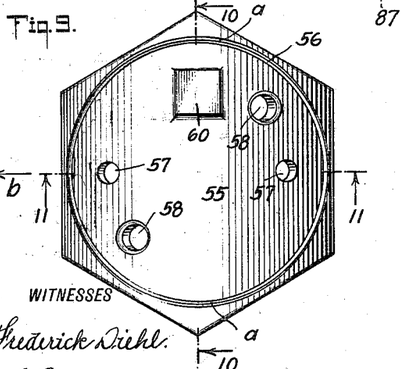
Fig. 9 is a plan view of one of the disk cutters.
Figure 10:
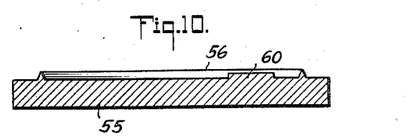
Figs. 10 and 11 are sectional views respectively on the lines 10—10 and 11—11, Fig. 9.
Figure 11:
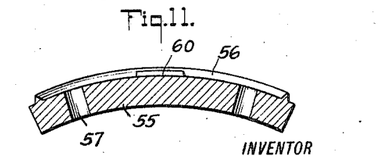

After the strip $g$ has passed through the printing mechanisms it passes onto the cutting mechanism C, which consists of a cutter cylinder 53 and a pressure cylinder 54, the latter being arranged above the former. The cutter cylinder is provided with a plurality of cutters constructed as shown in Figs. 9, 10 and 11, the same including an arcuate plate 55 having a continuous cutting edge 56 which coöperates with the pressure cylinder 54 to cut through the stock and completely sever a disk for a bottle cap. The cutters are arranged in circumferential rows so as to cut out a plurality of lines of staggered disks from the stock that feeds through the cutting mechanism. The cutters are secured in place by fasteners inserted through the openings 57 of the cutter plates 55, and also in each plate are openings 58 through which extend spring-pressed ejecting plungers 59, as shown in Figs. 5 and 6, whereby the disks or caps are prevented from adhering to the cutter cylinder by frictional engagement with the bevel cutting rib 56. By reference to Fig. 9 it will be observed that the portions $a$ of the cutting edge 56 do not produce any gripping effect on the strip of paper, assuming that the paper feeds with respect to the cutter in the direction indicated by the arrow $b$. It is therefore desirable to provide some means for clamping the strip of paper so that it will not slip with respect to the cutter, and for this purpose a lug 60 is formed on the plate 55, which is slightly of less height than the cutting ridge 56, as will be clearly seen in Fig. 11, and this lug will grip the strip of paper on the under side while the pressure roll 54 grips it on the upper side. This gripping is important because the draft on the strip through the machine is produced largely by the cutting mechanism. The cutting cylinder 53 has attached to its journal 61 a large gear wheel 62 that meshes with a pinion 63 on a power shaft 64, and at one end of the cylinder is fastened a gear 65 that meshes with a gear 66 on the end of the pressure cylinder 54, so that these two cylinders positively move together and draw the strip through the machine. The idler 49 which applies power to the printing mechanisms meshes with the gear 65. Meshing with the gear 66 is an idler gear 67 which engages with a gear 68 on the scrap or web roll 69 which conducts away the residue strip after the disks have been separated therefrom, as is shown in Fig. 3, the strip passing over the said roll 69 and under a coöperating idler scrap or web roll 70.

Figure 2:
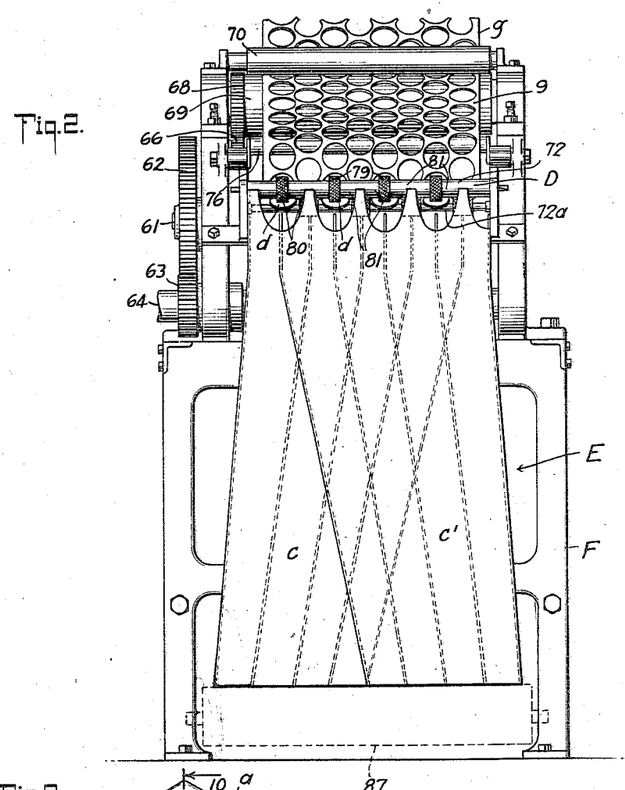
Fig. 2 is a front view showing the separator or delivery end of the machine.

The cutting mechanism in the present instance is designed to cut out eight lines or rows of caps from the strip $g$, as will be seen from Fig. 2, and these rows are as close together as possible, so as to minimize the waste of stock, and consequently the cuts of one row are staggered with respect to those of an adjacent row. This necessitates a special method of separating the caps or disks so that all the caps of each row will be kept together and in proper order, that is to say, with their printed sides facing the same way. Consequently the separating mechanism D is composed of two sets of separating rolls 71, 71$^a$, 72, 72$^a$, the first-mentioned separating rolls feeding the disks $d$ into the rear set of chutes $c$, as shown in Fig. 6, and the other set of separating rolls feeding the disks $d'$ into the front set of chutes $c'$, as shown in Fig. 5. Between the cutting cylinders and the feeding rolls are a pair of drawing rolls 73, 73$^a$, which draw the scrap or web and the disks forwardly together, the disks remaining in the same plane as the strip. Between these rolls 73 and 73$^a$ and the cutting cylinders is a stationary bridge plate or table 74 with which coöperates a plate 75 to maintain the disks or caps in the openings of the strip. This prevents the machine from clogging, and as the strip feeds through the rolls 73 and 73$^a$ the strip is led upwardly, as shown in Fig. 3, to and over an idler 76, and from the latter to the two rolls 69 and 70. By the bending of the scrap portion of the strip at the point 77, Fig. 5, the disks or caps become separated therefrom and feed forwardly into the separating rolls, the distance between the rolls 73, 73$^a$ and 71, 71$^a$ being slightly less than the diameter of the cap, so that there will be a feeding grip on the cap at all times, and this is also true with respect to the distance between the separating rolls 71, 71$^a$ and 72, 72$^a$. The rolls 71$^a$, 72$^a$, 73$^a$ are all positively driven by means of a train of gears 78, which derives power from the cutter cylinder 53. The rolls 71, 72 and 73 are idlers and are located to engage the upper faces of the disks while the coöperating rolls engage the under surfaces.

The roll 72 is provided with four spaced circumferential cap-engaging flanges 79 which are adapted to engage the caps of the first, third, fifth and seventh rows, reading from the left, Fig. 2, and the under roll 72$^a$ has circumferential flanges 80 located between the flanges 79 so as to engage the caps of the second, fourth, sixth and eighth rows. These flanges 80 coöperate with the portions 81 of the roll 72, so that the caps of the second, fourth, sixth and eighth rows will be conducted forwardly and drop into the front set of chutes $c'$, as clearly shown in Fig. 5. The flanges 79 act on the caps of the first, third, fifth and seventh rows to deflect these caps downwardly, as shown in Fig. 6, so as to pass into the rear set of chutes $c$. Just in front of the roll 71$^a$ are supports 82 formed by extensions of the rear wall 83 of the chute $c$, so as to support the disks as they are being led through by contact with the flanges 79 after the disks have passed between the rolls 71 and 71$^a$. The roll 71 is made up of a plurality of sleeves 84 having cap-engaging flanges 85, the said sleeves being mounted on a rod or shaft 86. The roll 71$^a$ is a cylinder of uniform diameter, as are also the rolls 73 and 73$^a$. If desired, the cap contact portions of all the rolls may be knurled to increase the gripping action.

The front set of chutes $c'$ inclines downwardly to one side while the rear set $c$ inclines downwardly to the opposite side, as clearly shown in Fig. 2, and the lower ends of all the chutes terminate in a single line so that the various caps can be fed through paraffin rolls suitably placed, as indicated by the dotted lines 87, while the caps are maintained separated. From the paraffin rolls the caps will pass in separated condition by suitable chutes (not shown) to receptacles or packing devices. To prevent the caps or disks from adhering to the walls of the chutes by reason of static electricity, wires, cords or other raised surfaces 88 are suspended on the rear walls of the chutes at the top thereof, as shown in Figs. 5 and 6, and the caps slide over these wires without the chutes becoming clogged or the disks overlapping.

It is to be understood that the machine can be used for cutting out other forms than circular disks or bottle caps, and the claims are not intended to be limited in scope merely by the use of the terms "disks" or "caps."

In order to keep the cutters on the cutter roll free from small particles or chips of cardboard, a freely revolving brush H is mounted on the frame at a point under the separating mechanism D, the bristles of the brush running in contact with the rotary cutter cylinder 53.

From the foregoing description taken in connection with the accompanying drawings, the advantages of the construction and method of operation will be readily understood by those skilled in the art to which the invention appertains, and while I have described the principle of operation, together with the machine which I now consider to be the best embodiment thereof, I desire to have it understood that the machine shown is merely illustrative and that such changes may be made when desired as fall within the scope of the appended claims.

Having thus described my invention, I claim as new and desire to secure by Letters Patent:

1. A bottle cap making machine comprising coacting cutting elements between which a strip of stock passes to cut caps therefrom, means on the discharge side of the cutting elements for maintaining the caps in the plane of the strip, a pair of rolls between which the strip and caps pass, another pair of rolls spaced from the first-mentioned rolls a less distance than the diameter of the caps, whereby a portion of the caps feed from the first to the second set of rolls, and means for directing the residue of the strip out of its normal path before reaching the second set of rolls.

2. A bottle cap making machine comprising coacting cutting elements between which a strip of stock passes to cut caps therefrom, means on the discharge side of the cutting elements for maintaining the caps in the plane of the strip, a pair of rolls between which the strip and caps pass, another pair of rolls spaced from the first-mentioned rolls a less distance that the diameter of the caps, whereby a portion of the caps feed from the first to the second set of rolls, means for directing the residue of the strip out of its normal path before reaching the second set of rolls, a plurality of chutes located one in advance of the other in the direction of travel of the disks, means for discharging certain of the disks in the first chute, and means for discharging other disks in the second chute.

3. In a machine of the class described, the combination of separate means for feeding disks in alternate rows, separate groups of chutes arranged one in front of the other and coacting rolls arranged at the chutes, said rolls having means for directing alternate rows of disks into the first chutes, and additional means on the rolls for delivering the remaining disks into the second group of chutes.

4. The combination of means for feeding a strip of material, coacting cylinders for cutting disks from the strip, a member on which the strip and cut disks pass from the cylinders, means coöperating with the member to hold the disks in the plane of the strip, rolls between which the strip and disks pass, means for deflecting the strip from the said rolls, means adjacent the rolls for carrying away the disks, rolls adjacent the first-mentioned rolls to receive the disks from the strip at the point of its deflection, and chutes arranged to receive the disks from the last-mentioned rolls.

5. The combination of means for conveying a strip of material, means for cutting out rows of disks in the material, with edges of adjacent rows overlapping, means for separating alternate rows of disks from the strip, and additional means for separating the remaining rows of disks from the strip.

6. The combination of means for cutting a plurality of rows of disks in a traveling strip, the edges of adjacent rows overlapping, means for maintaining the disks in the plane of the strip upon leaving the cutting means, means for deflecting the strip and feeding the disks forwardly in separated condition from the strip, and mechanism for separating the disks while keeping the disks of each row together.

7. The combination of means for cutting a plurality of rows of disks in a traveling strip, the edges of adjacent rows overlapping, means for maintaining the disks in the plane of the strip upon leaving the cutting means, means for deflecting the strip and feeding the disks forwardly in separated condition from the strip, a set of chutes for the disk of alternate rows, another set of chutes for the disks of the remaining rows, and means for conducting the disks to the proper chutes.

8. The combination of means for cutting a plurality of rows of disks in a traveling strip, the edges of adjacent rows overlapping, means for maintaining the disks in the plane of the strip upon leaving the cutting means, means for deflecting the strip and feeding the disks forwardly in separated condition from the strip, a set of chutes for the disks of alternate rows, another set of chutes for the disks of the remaining rows, a set of rolls for receiving the disks of alternate rows and directing them to their proper chutes, and additional rolls for receiving the disks of the remaining rows for conducting them to the respective chutes.

9. The combination of means for cutting rows of disks in a strip of material, the edges of the rows overlapping, means for causing the disks and cut strip to move in different paths, a pair of rolls for feeding the disks forwardly, a set of chutes, means adjacent the chutes for directing the disks of alternate rows into the same, means for conducting the disks over the said chutes, and a second set of chutes for receiving the last-mentioned disks.

PAUL RAYMOND SIMMONS.

Witnesses:
LUKE L. BAKER,
EARL L. FOOTE.